United States Patent [19]
Chiodini

[11] 4,138,794
[45] Feb. 13, 1979

[54] COMBINATION SINKER AND BAIT JUICE DISPENSER

[75] Inventor: Fernando Chiodini, Brooklyn, N.Y.

[73] Assignee: Fenco Corporation, Long Island City, N.Y.

[21] Appl. No.: 822,144

[22] Filed: Aug. 5, 1977

[51] Int. Cl.² .................. A01K 95/00; A01K 97/00
[52] U.S. Cl. ................................ 43/43.14; 43/44.99
[58] Field of Search ............... 43/42.06, 42.09, 42.22, 43/42.39, 43.1, 43.14, 44.92, 44.99; 222/187, 407

[56] References Cited

U.S. PATENT DOCUMENTS

| | | | |
|---|---|---|---|
| 2,465,127 | 3/1949 | Stark | 43/43.1 X |
| 2,532,879 | 12/1950 | Baker | 43/43.14 X |
| 2,742,731 | 4/1956 | Lovelace | 43/44.99 |
| 2,922,246 | 1/1960 | Mileschuk | 43/42.06 |
| 3,083,492 | 4/1963 | Kling | 43/44.99 X |
| 3,084,471 | 4/1963 | Alspaugh | 43/44.99 |

FOREIGN PATENT DOCUMENTS 403272  6/1970  Australia .................. 43/44.99

Primary Examiner—Nicholas P. Godici
Attorney, Agent, or Firm—Edward F. Levy

[57] ABSTRACT

A combination sinker and bait juice dispenser comprises a hollow perforated housing within which a sponge member rests on a base which is biased to a lower position by a helical spring. A shaft extends upward from the base and enables the user to compress and then release the sponge member for the purpose of charging the sponge member with bait juice. During use, the bait juice flows out of the housing through the perforations thereby creating a slick which attracts fish.

5 Claims, 5 Drawing Figures

COMBINATION SINKER AND BAIT JUICE DISPENSER

The present invention relates generally to apparatus for fishing and more particularly to a sinker adapted to contain and discharge bait juices.

The prior art related to fish lures includes various devices for dispensing liquid lure substances. However, these devices have, in general, been complex and cumbersome to operate and have not found wide use. One such device, described in U.S. Pat. No. 2,922,246, FISH LURE, incorporates a narrow flexible bladder filled with a liquid lure substance. The bladder is disposed in a casing having a pair of perforations which permit water pressure to act on the flexible bladder and force the liquid lure substance to flow through a nozzle into the water in order to attract fish. The device is relatively complex and incorporates carefully manufactured components which are required to provide a seal against premature leakage of the contents of the bladder. The use of this device is cumbersome since the liquid lure substance or bait juice must be poured carefully into the generally narrow-mouthed bladder.

The present invention overcomes the disadvantages of the prior art by providing a combination sinker and bait juice dispenser which can be easily charged with bait juice, and which releases the bait juice thereby creating a slick which attracts fish.

The combination sinker and bait juice dispenser, according to the present invention, comprises a hollow generally cylindrical housing which is perforated. Within the housing there is a sponge member which rests on a base which is biased by a helical spring to a lower position. A shaft extends from the base and projects outwardly of the housing. When the outer end of the shaft is pulled, both the helical spring and the sponge member are compressed.

The combination sinker and bait juice dispenser is provided with a pair of snap-on extension weights which may be used, in turn, to selectively increase the weight of the sinker to suit various fishing conditions.

In use, the outer end of the shaft is attached to a fishing line and before dropping the device into the water, the sponge member is compressed by pulling the shaft. The entire device is immersed in a container of juices from the bait being used. The shaft is released to saturate the sponge member with a charge of bait juice and the charged device is let down into the water. The fishing line has a leader to which a baited hook is attached. The hook will attempt to follow the current which is normally present when fishing. The bait juice will flow through the perforated housing into the water and flow in the direction of the current and travel past the hook in the form of a slick. Fish picking up the slick will follow it to the baited hook. By making a sudden short jerk on the fishing line, the user can momentarily compress the sponge member to create a large discharge of bait to entice the fish.

It is an object of the present invention to provide a combination sinker and bait juice dispenser which can be easily charged with bait juice.

Another object of the present invention is to provide a combination sinker and bait juice dispenser which includes a sponge member which can be compressed and released to accept a charge of bait juice.

Another object of the present invention is to provide a combination sinker and bait juice dispenser which is adapted for accepting an extension weight for the purpose of increasing the overall weight of the device.

Still another object of the present invention is to provide a combination sinker and bait juice dispenser which comprises relatively few parts which are economical to manufacture. The device may be easily and conveniently disassembled for cleaning or for replacement of the sponge therein.

Additional objects and advantages of the invention will become apparent during the course of the following specification when taken in connection with the accompanying drawing in which.

Figure 1:
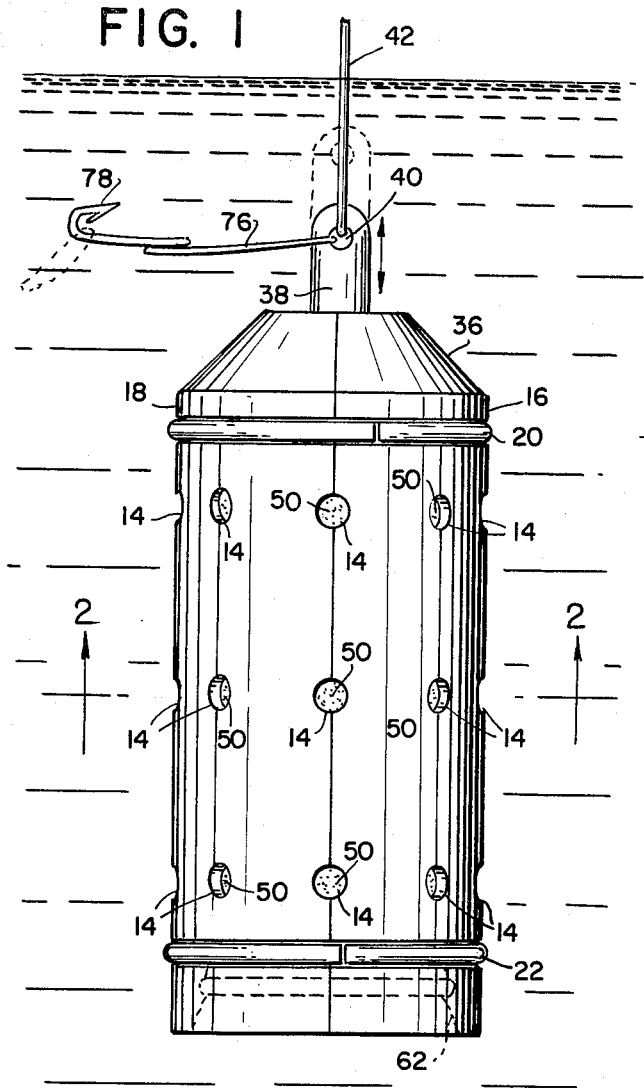
FIG. 1 is an elevational view of a combination sinker and bait juice dispenser made in accordance with the present invention, shown, in use, submerged under water and attached to a line carrying a fishing hook.

Referring in detail to the drawings, there is shown in FIG. 1 a combination sinker and bait juice dispenser 10 comprising a hollow cylindrical housing 12 having a plurality of perforations 14 distributed throughout the wall thereof. The housing 12 comprises two identical half sections 16, 18 which are held together by a pair of spaced split rings 20, 22 of spring material which rings are lodged, one each, in circumferential grooves 24 and 26 of the housing 12.

Figure 2:
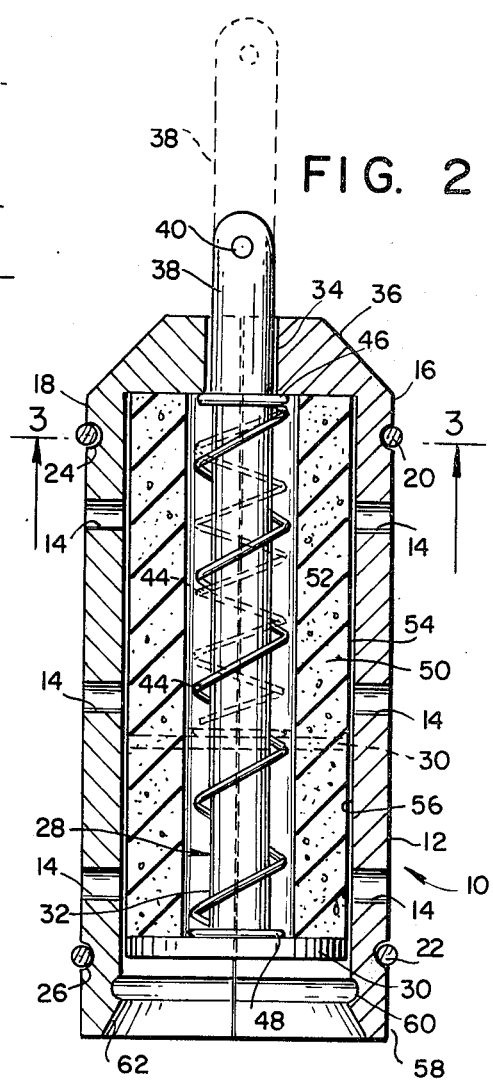
FIG. 2 is a longitudinal central cross-sectional view of the combination sinker and bait juice dispenser of FIG. 1.
Figure 3:
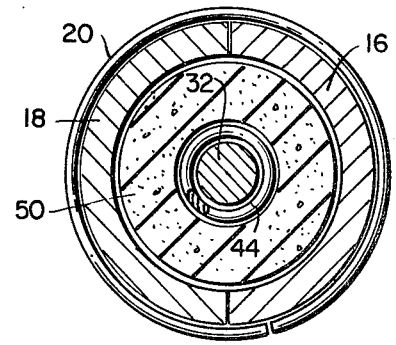
FIG. 3 is a sectional view taken along the line 3—3 of FIG. 2.

Slidably mounted within the hollow interior of the housing 12 is a plunger 28. As shown in FIG. 2 the housing 12 comprises a flat circular base 30 formed integrally with or secured to an upstanding cylindrical shaft 32. The housing 12 has a top wall 36 formed with a large central aperture 34. The shaft 32 extends upwardly from the base 30 through the center of the hollow housing 12 and through the aperture 34, as shown in FIGS. 2 and 3, said shaft 32 being of sufficient length that its upper end portion 38 projects outwardly of the housing 12 when the base 30 is biased to its lowered position of FIG. 2. The upper end portion 38 of the shaft 32 is provided with a hole 40 for attachment of the device 10 to a fishing line 42, as shown in FIG. 1.

A helical compression spring 44 is mounted on the shaft 32 with its upper end 46 bearing against the upper wall 36 of housing 12, and its lower end 48 bearing against the base 30. The spring 44 urges the plunger 28 to the lowered position shown in solid lines in FIG. 2. Also surrounding the shaft 32 within the housing 12 is a sponge 50 of tubular shape, the sponge having an inner surface 52 which extends around the spring 44 and an outer surface 54 which fits within the inner surface 56 of the housing 12.

The housing 12 has an open lower portion 58, on the inner surface of which is formed an annular groove 60, beneath which is an outwardly-flared surface 62. This construction is provided for the purpose of enabling selected extender weights to be attached to the sinker 10 to increase the weight thereof. By way of preferred example, two extender weights 64 and 66, of different size, are shown in the drawings, either of which extender weights being removably attachable to the sinker 10 by snap-in insertion into the open lower portion of the sinker.

Figure 4:
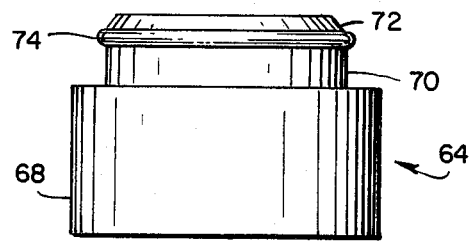
FIG. 4 is an elevational view of a first extension weight for use with the combination sinker and bait juice dispenser of FIG. 1.

The extender weight 64, shown in FIG. 4, has a cylindrical main body portion 68 of substantially the same diameter as the sinker housing 12 and an upper extension portion 70 of lesser diameter. The upper end of the extension portion 70 terminates in an inwardly tapered surface 72 beneath which projects a circumferential bead 74. The bead 74 is sized to fit snugly within the annular groove 60 in the lower end of the sinker housing 12.

In use, the tapered surface 72 of the extension portion 70 of extender weight 64 is introduced into the outwardly flared portion 62 of the housing 12 and the extender weight 64 is forced upwardly. This action causes the spring split rings 20 and 22 to expand, permitting the housing halves 16 and 18 to separate sufficiently to enable the bead 74 of the extender weight 64 to lodge in the groove 60. The resilience of the split rings 22 and 22 returns then to their original shape, thereby urging the housing halves 16 and 18 together and retaining the extension weight 64 securely in mounted position. The lower ring spring 22 is located relatively close to the internal groove 60, thereby providing a substantial amount of force which opposes the separation of the housing halves 16, 18 and preventing unwanted separation of the extension weight 64 for the housing during the process of casting and retrieving the fishing line 42.

Figure 5:
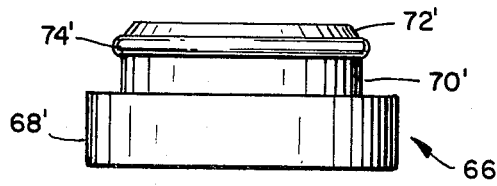
FIG. 5 is an elevational view of a second extension weight for use with the combination sinker and bait juice dispenser of FIG. 1.

FIG. 5 shows the extension weight 66 which differs from the extension weight 64, shown in FIG. 4, only in the smaller size of the lower body portion 68'. The lower portion 68' has been made smaller than the lower portion 68 on the extension weight 64 in order to provide a different overall weight for the device 10.

In a preferred embodiment of the invention, the combination sinker and bait juice dispenser 10 is provided with a weight of approximately four ounces, while the extension 64 is provided with a weight of four ounces, and the extension 66 is provided with a weight of two ounces. The user thus has a choice of overall sinker weights to suit various fishing conditions by selectively using the sinker device 10 alone for an overall weight of four ounces, or with the extension weight 66 attached for an overall weight of six ounces, or with the extension weight 64 attached for an overall weight of eight ounces.

The choice of weights for the extension weights 64, 66 and for the combination sinker and bait juice dispenser 10 can be varied by modification of the proportions of the various components. In addition, a greater range of operating weights may be achieved by providing an increased number of extension weights of various sizes, each having an upper extension portion identical to the respective upper extension portions 70, 70' on the extension weights 64 and 66.

In use, the combination sinker and bait juice dispenser 10 is attached to a fishing line 42 using the hole 40 in the protruding upper end 38 of the shaft 32. A leader 76 having a baited fishing hook 78 is also attached within the hole 40, as shown in FIG. 1. Before dropping the combination sinker and bait juice dispenser 10 into the water, the shaft 32 is pulled upwardly compressing the helical spring 44 and the sponge member 50, as indicated in broken line in FIG. 2. In this compressed condition, the entire device 10 is immersed in a container of juices from the bait being used. The shaft 32 is then released, and the helical spring 44 forces the base 30 downwardly so that the sponge member 50 expands and becomes saturated with a charge of bait juice. The entire device 10 is now dropped into the water. The leader 76 attempts to follow the current which is normally present when fishing. The bait juice flows from the sponge member 50, through the perforations 14 in the housing 12 and enters the current forming a slick which travels past the baited hook 78. Fish picking up the slick will follow it to the baited hook 78. By making a sudden short jerk on the fishing line at selected intervals, the user can cause the shaft 32 to move upwardly within the housing 12. Thus momentarily compressing the sponge member 50 to release a larger discharge of bait juice to entice the fish. Extension weight 64 or 66 may be added to the combination sinker and bait juice dispenser 10 to increase the overall weight, as desired, to suit various fishing conditions.

While a preferred embodiment of the invention has been shown and described herein, it is obvious that numerous omissions, changes and additions may be made in such embodiment without departing from the spirit and scope of the invention.

What is claimed is:

1. A combination sinker and bait juice dispenser comprising a hollow housing having at least one fluid outlet aperture therein and including an open lower portion having an internal groove, a resilient sponge member disposed within said hollow housing, plunger means for alternately compressing and releasing said sponge member for charging said sponge member with a charge of bait juice, attachment means for connecting a fishing line to said plunger means, and a plurality of extension weights releasably attachable to said hollow housing for removably adding weight to said device, said plurality of extension weights each including an extension portion having a projecting bead removably engaging the internal groove of said hosing lower portion for attachment of said extension weight to said housing.

2. A combination sinker and bait juice dispenser according to claim 1 in which said plunger means comprises a plunger slidably disposed within said housing and including a base portion underlying the lower portion of said sponge member and a shaft extending upwardly from said base portion and projecting through an aperture formed in the upper end of said housing, and a compression spring disposed between said housing and said base portion urging said base portion to a lowered position in which said sponge member is uncompressed, said base portion being movable to an elevated position in response to upward force applied to said shaft, said base member in said elevated position compressing said spring and said sponge member.

3. A combination sinker and bait juice dispenser according to claim 1 in which said housing includes perforated side wall portions.

4. A combination sinker and bait juice dispenser according to claim 1 in which said housing comprises a pair of symmetrical half sections, and a pair of spaced apart spring members connecting said symmetrical half sections.

5. A combination sinker and bait juice dispenser according to claim 4 in which said housing open lower portion has an outwardly tapered surface portion, and the projecting portion of each of said extension weights is formed with an inwardly tapered end portion sized to fit within said outwardly tapered surface portion, such that engagement of the inwardly tapered end portion of said projecting portion of an extension weight with said outwardly tapered surface portion of said housing and application of a force along said taper causes expansion of said spring members and separation of said housing halves sufficiently to permit said projecting bead to seat within said internal groove for removable attachment of said extension weight to said housing.

* * * * *